US011857048B2

(12) United States Patent
Hugues

(10) Patent No.: US 11,857,048 B2
(45) Date of Patent: Jan. 2, 2024

(54) MECHANISM FOR OPENING/CLOSING AN OPENING LEAF WITH RESPECT TO A FRAME

(71) Applicant: PA.COTTE SA, Pully (CH)

(72) Inventor: Pascal Hugues, Orvault (FR)

(73) Assignee: PA.COTTE SA, Pully (CH)

( * ) Notice: Subject to any disclaimer, the term of this patent is extended or adjusted under 35 U.S.C. 154(b) by 567 days.

(21) Appl. No.: 16/759,261

(22) PCT Filed: Oct. 22, 2018

(86) PCT No.: PCT/EP2018/078935
§ 371 (c)(1),
(2) Date: Apr. 24, 2020

(87) PCT Pub. No.: WO2019/081446
PCT Pub. Date: May 2, 2019

(65) Prior Publication Data

US 2020/0367626 A1 Nov. 26, 2020

(30) Foreign Application Priority Data

Oct. 26, 2017 (EP) .................................... 17198682

(51) Int. Cl.
*A45C 13/04* (2006.01)
*E05F 15/622* (2015.01)
(Continued)

(52) U.S. Cl.
CPC ................ *A45C 13/04* (2013.01); *A45C 3/02* (2013.01); *A45C 13/005* (2013.01); *E05D 15/56* (2013.01);
(Continued)

(58) Field of Classification Search
CPC ......... A45C 13/04; A45C 3/02; A45C 13/005; A45C 3/03; E05D 15/56; E05D 1/00;
(Continued)

(56) References Cited

U.S. PATENT DOCUMENTS 1,326,333 A * 12/1919 Frank .................... B65D 85/12 16/337
1,930,308 A * 10/1933 Devlin ................ A45C 13/005 16/288
(Continued)

FOREIGN PATENT DOCUMENTS

CN 101512091 A 8/2009
FR 2 522 055 A1 8/1983
(Continued)

OTHER PUBLICATIONS

FR 2870691 A1 English Translation (Year: 2005).*
(Continued)

*Primary Examiner* — John K Fristoe, Jr.
*Assistant Examiner* — Justin Caudill
(74) *Attorney, Agent, or Firm* — SoCal IP Law Group LLP; Angelo Gaz

(57) ABSTRACT

Mechanism for opening/closing an opening leaf with respect to a frame. The mechanism is configured to cause, upon opening, a lifting of the opening leaf from a closure plane to an opening plane parallel to the closure plane, followed by a pivoting of the opening leaf about a pivot axis orthogonal to the translational movement of the opening leaf, and vice versa upon closing. The mechanism comprises: a fixed frame; a movable frame mounted translationally on the fixed frame; a hinge part mounted in a pivoting manner on the movable frame and coupled to a mechanism for attachment to the opening leaf; an actuator comprising an output member which can be actuated in a direction orthogonal to the
(Continued)

pivot axis of the opening leaf; and a transmission that comprises a transmission link coupled in a pivoting manner to the output member, and to the hinge part.

11 Claims, 8 Drawing Sheets

(51) Int. Cl.
*A45C 3/02* (2006.01)
*A45C 13/00* (2006.01)
*E05D 15/56* (2006.01)

(52) U.S. Cl.
CPC ....... *E05F 15/622* (2015.01); *E05Y 2900/602* (2013.01)

(58) Field of Classification Search
CPC .. E05D 11/1021; E05D 15/406; E05F 15/622; E05Y 2900/602; F24F 13/1426
USPC ............................................ 220/810; 16/221
See application file for complete search history.

(56) References Cited

U.S. PATENT DOCUMENTS

| | | | | | | |
|---|---|---|---|---|---|---|
| 2,170,014 | A | * | 8/1939 | Ellis | E05F 15/63 | 318/285 |
| 3,093,258 | A | * | 6/1963 | Turner | A45C 13/34 | 217/60 E |
| 3,722,142 | A | * | 3/1973 | Anderberg | E05D 15/406 | 49/248 |
| 4,239,093 | A | * | 12/1980 | Eubanks | A45C 13/34 | 190/106 |
| 4,383,347 | A | * | 5/1983 | La Conte | E05F 1/1292 | 16/370 |
| 4,448,292 | A | * | 5/1984 | Comfort | A45C 5/00 | 220/4.28 |
| 4,522,288 | A | * | 6/1985 | Wickman | A45C 13/34 | 190/117 |
| 4,744,445 | A | * | 5/1988 | Anderson | A45C 5/02 | 217/65 |
| 6,409,064 | B1 | * | 6/2002 | Bayley | B60R 9/00 | 224/404 |
| 6,634,140 | B1 | * | 10/2003 | Sellman | E05F 15/63 | 49/340 |
| 6,754,990 | B2 | * | 6/2004 | Pedemonte | E05F 15/63 | 49/342 |
| 8,272,104 | B2 | * | 9/2012 | Chen | G06F 1/1624 | 16/327 |
| 8,572,808 | B2 | * | 11/2013 | Bonomie | H01H 3/162 | 16/374 |
| 2006/0265958 | A1 | * | 11/2006 | Cheramy | E05D 15/00 | 49/350 |
| 2014/0132141 | A1 | * | 5/2014 | Sun | E05D 7/0027 | 16/248 |
| 2014/0299492 | A1 | * | 10/2014 | Liu | A24F 15/01 | 206/264 |
| 2016/0066452 | A1 | * | 3/2016 | Music | A45C 9/00 | 206/742 |

FOREIGN PATENT DOCUMENTS

| | | | |
|---|---|---|---|
| FR | 2 640 474 | A1 | 6/1990 |
| FR | 2 870 691 | A1 | 12/2005 |
| WO | 2019/081446 | A1 | 5/2019 |

OTHER PUBLICATIONS

European Patent Office, International Search Report and Written Opinion for PCT Application No. PCT/EP2018/078935 dated Nov. 15, 2018.

CNIPA, First Notification of Office Action for Chinese Patent Application No. 201880069737.5, dated Feb. 21, 2023.

* cited by examiner

*Fig. 6*
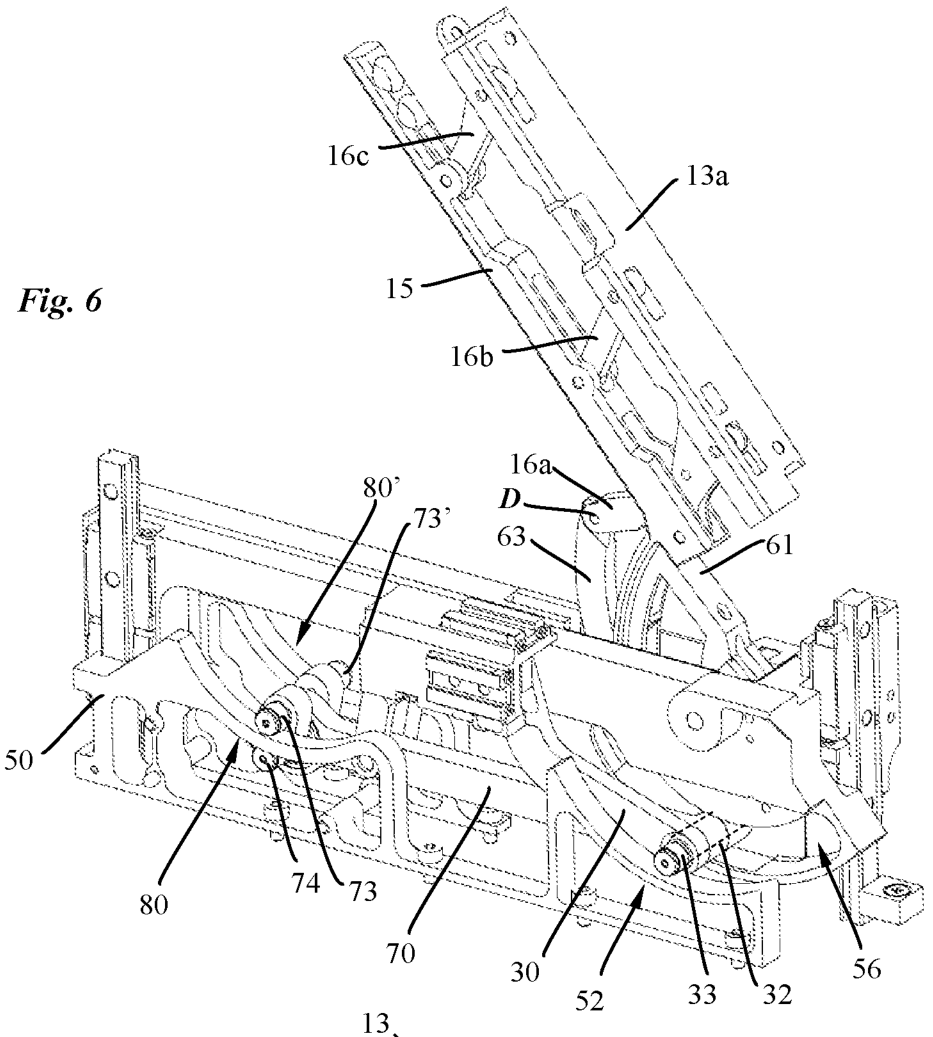
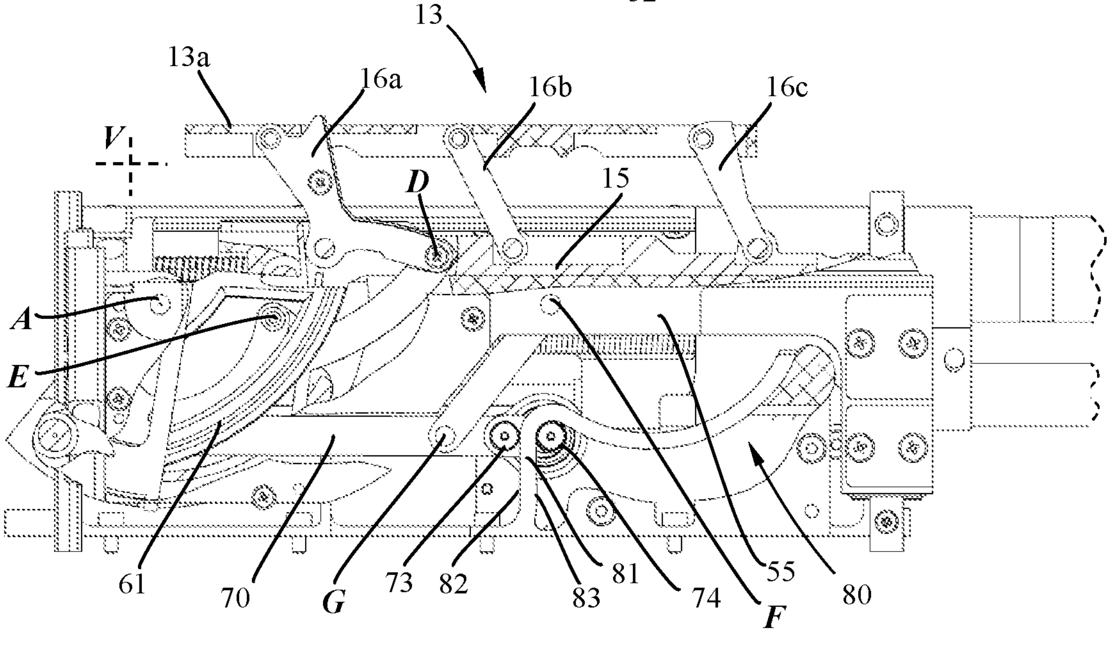
*Fig. 7a*

MECHANISM FOR OPENING/CLOSING AN OPENING LEAF WITH RESPECT TO A FRAME

RELATED APPLICATION INFORMATION

This patent claims priority from International PCT Patent Application No. PCT/EP2018/078935, filed Oct. 22, 2018 entitled, "MECHANISM FOR OPENING/CLOSING AN OPENING LEAF WITH RESPECT TO A FRAME", which claims priority to European Patent Application No. EP17198682.1, filed Oct. 26, 2017 all of which are incorporated herein by reference in their entirety.

TECHNICAL FIELD

The field of the invention is that of the design and manufacturing of opening/closing mechanisms of opening panels, of the type causing upon opening a translation of the opening panel from a closing plane to an opening plane parallel to the closing plane, followed by a pivoting of the opening panel about an axis of pivot orthogonal to the translation of the opening panel, and conversely on closing.

TECHNOLOGICAL BACKGROUND

In the field of the invention, it is conventional to have to envision complex kinematics, consisting on the one hand, for the opening, in disengaging the opening panel from the opening plane of the casing by a translation into a direction orthogonal to the opening plane of the casing, then in pivoting the opening panel about an axis of rotation parallel to or colinear with one of its edges and, on the other hand, for the closing, in pivoting the opening panel about the axis of rotation to bring it back into a plane parallel to that of the casing, then in translating the opening panel such that it fits into the casing.

Such kinematics are justified in particular when the opening panel, in the closing position, fits into the inside of the casing with very little play and has a thickness not making it possible, given the small amount of play between the opening panel and the casing, to perform, on opening, only and directly a pivoting movement. It is therefore necessary to disengage the opening panel away from the casing by a movement of translation orthogonal to its own plane (and therefore to that of the casing) to then pivot it. Of course, similar mechanisms exist wherein the rectilinear translation is followed, for example, by a curvilinear translation of the opening panel or even a second rectilinear translation perpendicular to the first.

In the case of opening/closing mechanisms performing, on opening, a translation of the opening panel orthogonally to its own plane followed by a rotation, many applications may be envisioned, and particularly: doors and windows of dwellings; vehicle opening panels, whether they are land (road or rail), sea or air vehicles; the doors of safes, and the lids of cases, suitcases, and briefcases.

Many mechanical solutions have been proposed by the prior art to break down the movements such as that applied within the context of the invention (translation and rotation).

Those skilled in the art therefore have at their disposal a wide choice of designs, more or less appropriate according to the applications and according to the restrictions or criteria of the technical specifications related to the opening/closing mechanism. It is thus clear that the weight and mechanical strength criteria are different for an opening panel of a safe than for a suitcase lid.

Moreover, according to the applications, the opening/closing mechanisms can be manual, motorized or "mixed", that is to say permitting the two modes of operation, manual and motorized. However, as regards applications implementing a motorization, it is conventional to employ an actuator dedicated to one of the two movements. Within this meaning, several scenarios are possible, namely: an actuator dedicated to the translation, the rotation of the opening panel being obtained manually; an actuator dedicated to the rotation, the translation of the opening panel being obtained manually; two actuators, one dedicated to the translation and the other to the rotation.

Of course, for mechanisms for which the motorization of both movements is desired, the fact of having to implement two actuators generates drawbacks including: the bulk and incorporation of the two actuators; the cumulative weight of the actuators; the synchronization, or even slaving of the two actuators together; the time of assembly and adjustment of the two actuators, and the cost of the actuators.

It is self-evident that such drawbacks are multiplied by a factor equal to the number of hinges equipping, where applicable, the equipment provided with the opening/closing mechanism. In addition, these drawbacks can turn out to be more damaging to certain applications than to others. Specifically, the bulk problem for example turns out to be even more of a concern when the available volume is reduced, as is the case in a suitcase, or in a briefcase.

Other considerations also tend to increase the difficulty or drawbacks of implementation of two actuators, particularly: the aesthetic nature of the mechanism, in situations where there is a desire to make the mechanism and its actuators as discreet as possible; the requirement for perception of high quality, which involves limiting as much as possible the levels of noise and vibration of the mechanism; the requirement for high-level reliability, which involves suppressing, or at least limiting as much as possible the need for maintenance operations, and "the elegance" of the opening/closing kinematics, offering a feeling of smoothness and fluidity of the movements of the opening panel.

The invention particularly has the aim of solving the drawbacks of the prior art.

More precisely, the objective of the invention is to propose a mechanism of opening/closing of an opening panel with respect to a casing, of the type causing on opening a translation of the opening panel from a closing plane to an opening plane parallel to the closing plane, followed by a pivoting of the opening panel about an axis of pivot orthogonal to the translation of the opening panel, and conversely on closing, which allows the motorization of the two movements with an actuating system less bulky and easier to incorporate than a mechanism of the same capability of the prior art.

The invention also has the objective of supplying such an opening/closing mechanism which entails less weight than a mechanism of the same capacity of the prior art.

The invention also has the objective of supplying such an opening/closing mechanism making it possible to envision simplifications of implementation of the actuating system and/or its assembly and its adjustment.

Yet another objective of the invention is to supply such an opening/closing mechanism making it possible to achieve a high level of performance, reliability and quality perceived by the user.

SUMMARY OF THE INVENTION

These objectives, along with others that will appear below, are achieved owing to a first aspect of the invention which has as its subject a mechanism of opening/closing of an opening panel with respect to a casing. The mechanism is configured to cause on opening an elevation of the opening panel from a closing plane to an opening plane parallel to the closing plane, followed by a pivoting of the opening panel about an axis of pivot orthogonal to the translation of the opening panel, and conversely on closing. For this purpose the mechanism includes a fixed frame; a movable frame mounted in translation on the fixed frame; a hinge part mounted pivotably on the movable frame and coupled to a mechanism of fastening to the opening panel; an actuator containing an extension member actuatable in a rectilinear direction orthogonal to the axis of pivot of the opening panel; and a transmission. This transmission includes a transmission rod comprising a first articulation coupled pivotably to the extension member, and a second articulation coupled pivotably to the hinge part. The fixed frame includes a guiding arrangement configured to cooperate with the transmission such that the movement of the extension member, during the opening of the mechanism, causes the elevation of the movable frame with respect to the fixed frame, then the rotation of the hinge part by a desired angle in order to pass from a closed configuration to an opening configuration of the opening/closing mechanism.

According to a first essential feature of the invention, an actuating system implements a single actuator to move the opening panel translationally and pivotably. It should be noted that the actuator system can include, for each hinge of the mechanism (in a configuration wherein several hinges are therefore present), a single actuator (with then as many actuators as there are hinges) or, alternatively, a single actuator shared by several hinges. The principle of a single actuator, used for both translation and pivoting, offers many advantages including: the limitation of the weight of the mechanism; the limitation of the bulk of the mechanism and, consequently, an easier incorporation into the assembly including the opening panel and the casing, and simplifications of assembly and adjustment.

Furthermore, as will become more clearly apparent below, the reduction of the bulk makes it possible to incorporate the actuators more discreetly, making it possible to envision an advantageous result on the aesthetic front.

According to an advantageous embodiment, the guiding arrangement includes a guiding path provided with a rectilinear portion followed by a semi-circular incurvated portion. The rectilinear and incurvated portions are intended to cooperate with one end of the transmission rod under the action of the movement of the extension member along the rectilinear direction.

According to an advantageous embodiment the transmission further includes a coupling rod coupled pivotably by one of its ends to the hinge part and to the transmission rod and including at the other of its ends a guiding member. The guiding arrangement further includes a first and a second rail arranged to cooperate with the guiding member.

According to an advantageous embodiment the first and a second guiding rail are arranged facing one another and each successively include a rectilinear portion extending vertically, a convex portion and an incurvated portion. Each portion includes a first and a second surface located on either side of the guiding rail and each defining a guiding path.

According to an advantageous embodiment, the guiding member includes a bearing arranged inside a circular opening of the coupling rod and two pairs of rollers each mounted on a roller support. The roller supports are arranged on either side of the bearing such that the rollers of each support are maintained in contact on either side of the thickness of the respective guiding rail to be moved along their respective guiding paths during the opening and the closing of the mechanism in order to provide the pivoting of the opening panel along a precise trajectory without any play.

According to an advantageous embodiment, the mechanism of fastening to the opening panel is arranged to be rotationally actuated about the axis of pivot orthogonal to the translation of the opening panel. This axis of pivot corresponds to a virtual axis of pivot located above the casing.

According to an advantageous embodiment, the mechanism of fastening to the opening panel includes a link support forming a single part with the hinge part and several links coupled pivotably by one of their ends to the link support and by the other of their ends to the mechanism of fastening to the opening panel. The fastening mechanism forms an expandable and collapsible parallelogram.

According to an advantageous embodiment, the opening/closing mechanism further includes a member of actuation of the parallelogram comprising an actuating arm coupled pivotably to one of the links on the one hand and to an arm support on the other hand. The arm support forms a single part with the movable frame.

According to an advantageous embodiment, the opening/closing mechanism further includes a coupling stem connected to one end of the transmission rod such that the axis of the stem is perpendicular to a plane wherein the link moves. The stem is moreover coupled pivotably to the hinge part.

According to an advantageous embodiment, the movable frame includes a window of elongated and incurvated form inside which the coupling stem passes through.

According to an advantageous embodiment, each end of the transmission rod is coupled pivotably to, respectively, the extension member and to the hinge part on either side of the movable frame.

According to an advantageous embodiment, the extension member is in the form of a carriage mounted in translation on a worm screw. One of the ends of the worm screw is coupled to a motor while the other end is mounted in a bearing such that the rotation of the motor drives the carriage along the rectilinear direction orthogonal to the axis of pivot of the opening panel.

A second aspect of the invention relates to a briefcase comprising a case forming a casing, a lid forming an opening panel, and a mechanism according to the invention coupling the lid to the case.

According to an advantageous embodiment, the lid is at least partly fitted into the case when the briefcase is in a closed position.

BRIEF DESCRIPTION OF THE FIGURES

Other features and advantages of the invention will become more clearly apparent on reading the following description of a preferred embodiment of the invention, given by way of illustrative and non-limiting example, and the appended drawings wherein:

FIG. 6 is a perspective view of a part of the opening/closing mechanism.

FIGS. 7*a* to 7*e* each show a view similar to FIG. 2 when the briefcase is found in the following configurations: cover raised with pivoting of the lid of respectively 0°, 2.4°, 4.8°, 50° and >90° with respect to the case;

DETAILED DESCRIPTION OF A PREFERRED EMBODIMENT

As illustrated by FIGS. 1*a* to 9, an opening/closing mechanism 10 (FIG. 1*b*) according to the invention is incorporated into a briefcase and is coupled to an actuator 17 with the aim of moving an opening panel 12 with respect to a casing 14. The opening panel forms the lid of the briefcase while the casing forms the case of the briefcase.

Figure 1A:
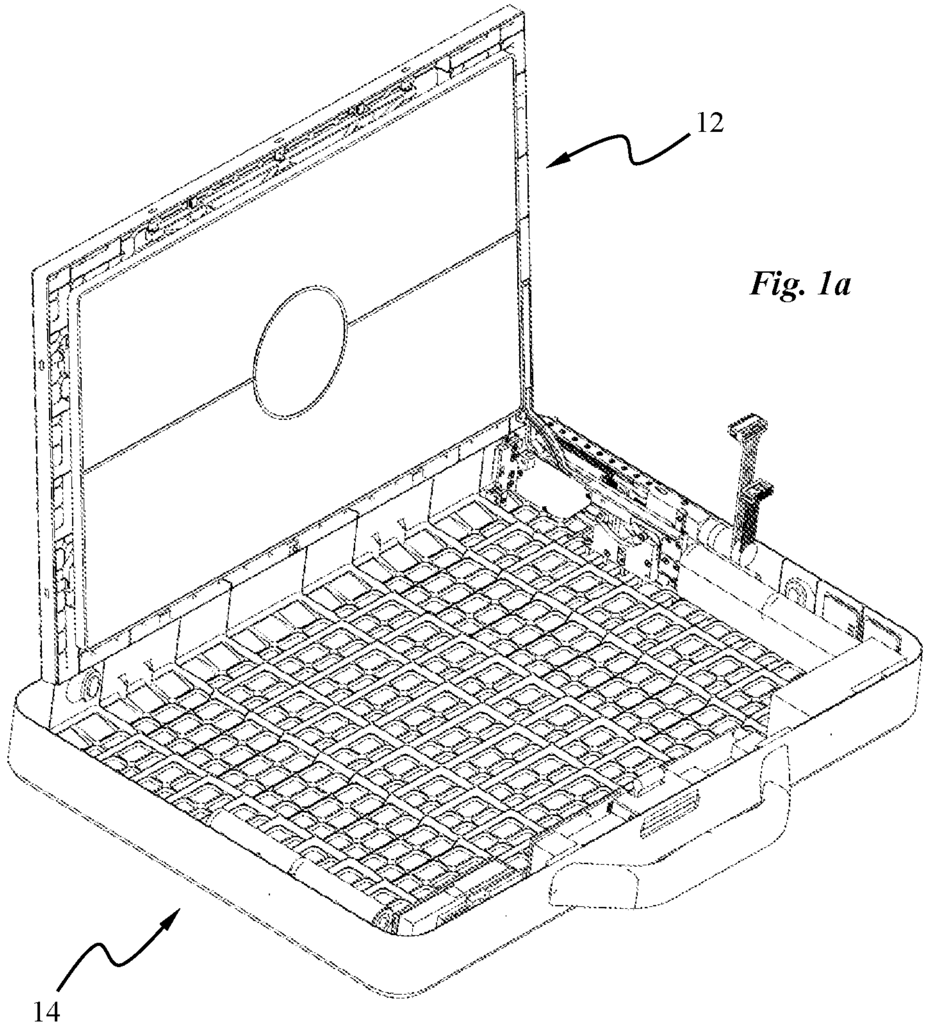
FIG. 1*a* is a perspective view of a briefcase according to a preferred embodiment including the opening/closing mechanism, the briefcase being in an open configuration.
Figure 1B:
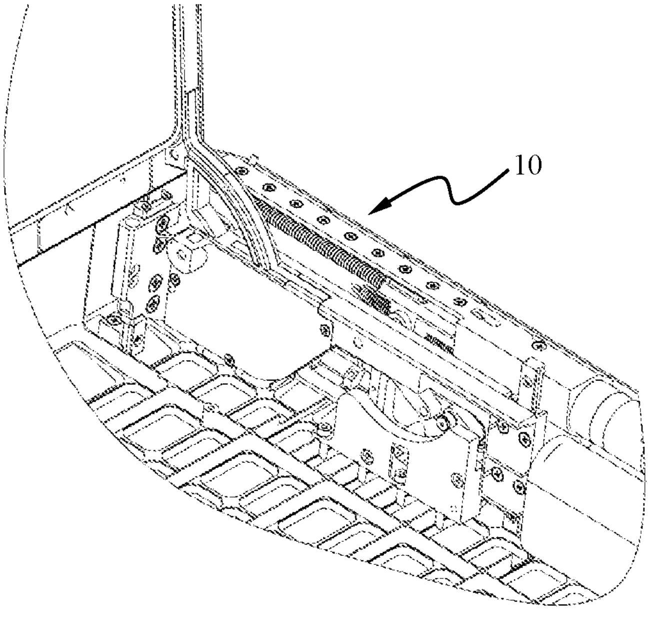
FIG. 1*b* is a partial view of FIG. 1*a* showing the opening/closing mechanism in its location.
Figure 2:
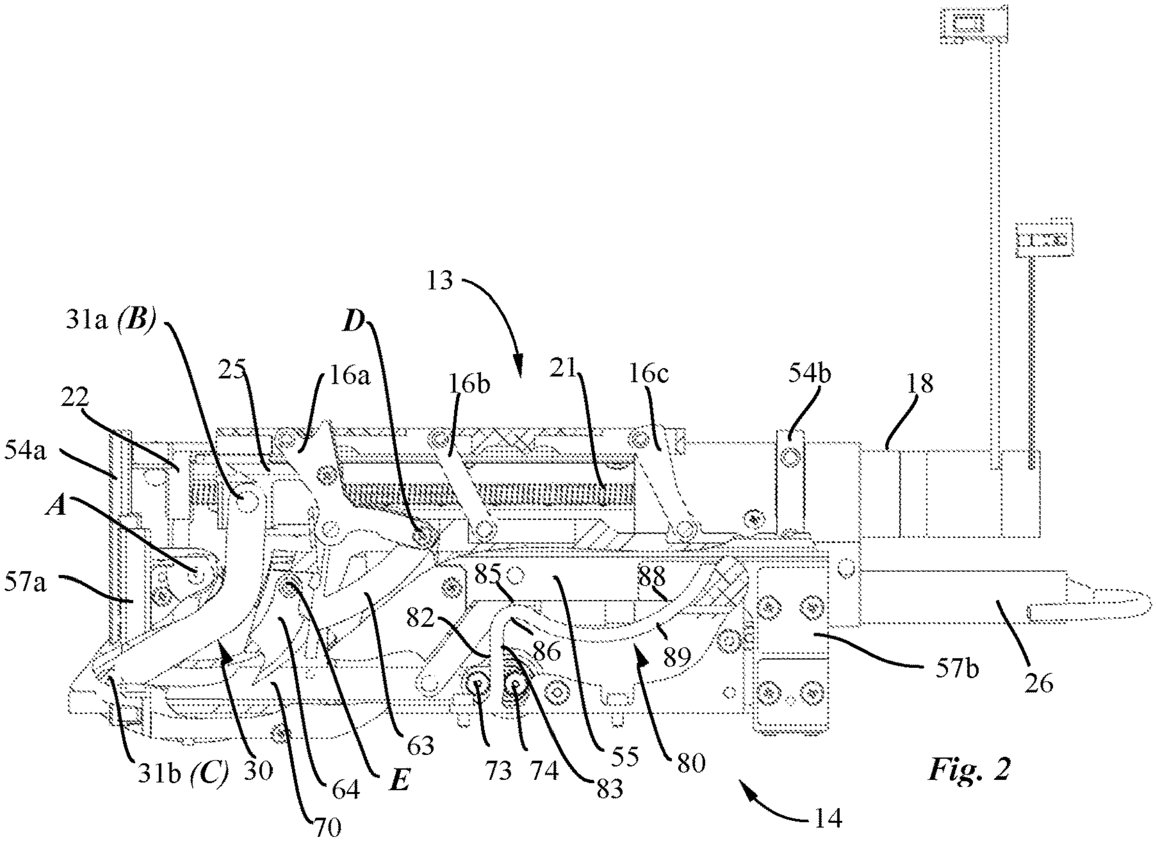
FIG. 2 is a partial section view of a lateral side of the briefcase in a closed configuration.
Figure 3:
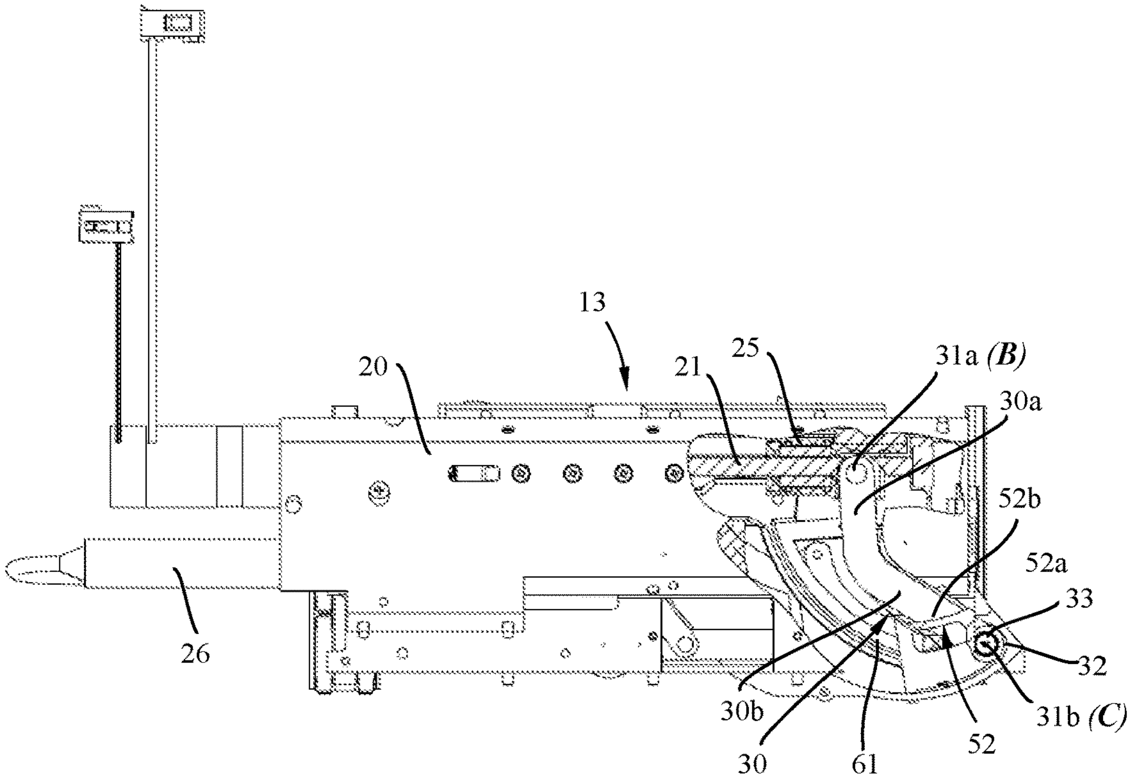
FIG. 3 is a partial section view of the other lateral side of the briefcase in a closed configuration.

The opening/closing mechanism 10 of the briefcase includes a fastening mechanism 13 including a fastening part 13*a* connected to the lid 12. The fastening mechanism 13 is designed to cause the opening of the briefcase by a translation of the fastening part 13*a* from a closing plane of the case 14 as illustrated by FIGS. 2 and 3 to an opening plane parallel to the closing plane as illustrated by FIG. 7*a*. The fastening part 13*a* of the lid 12 is translated in elevation with respect to the case 14 from a position from which the lid is at least partly fitted into the case 14 to a position wherein it is disengaged from the case.

Figure 7B:
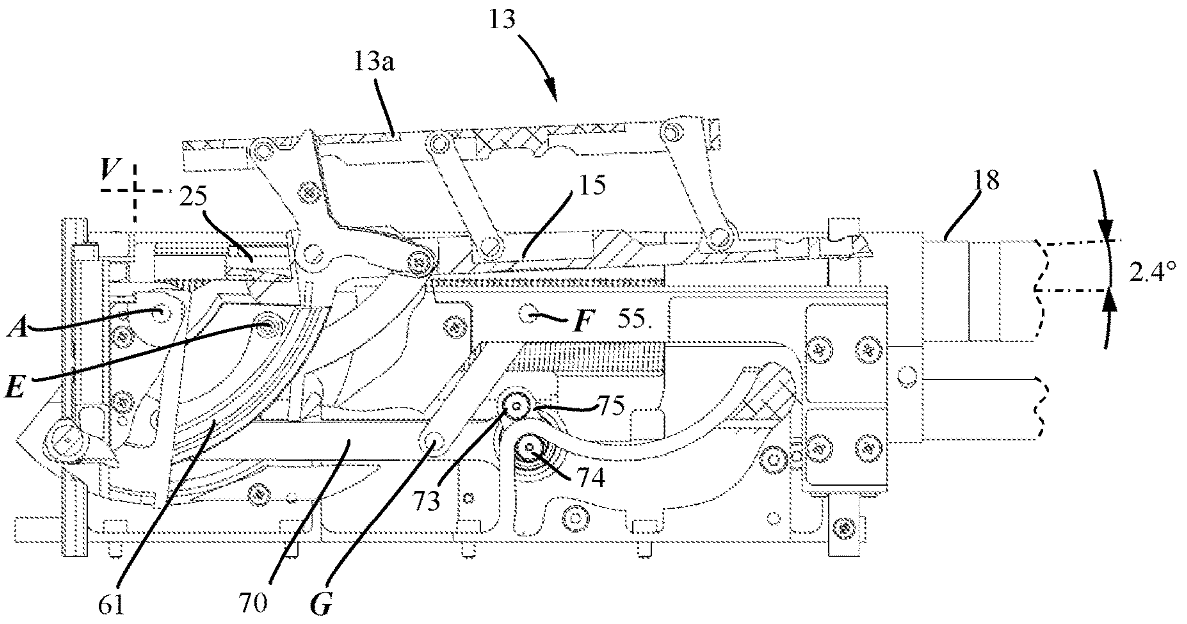
Figure 7C:
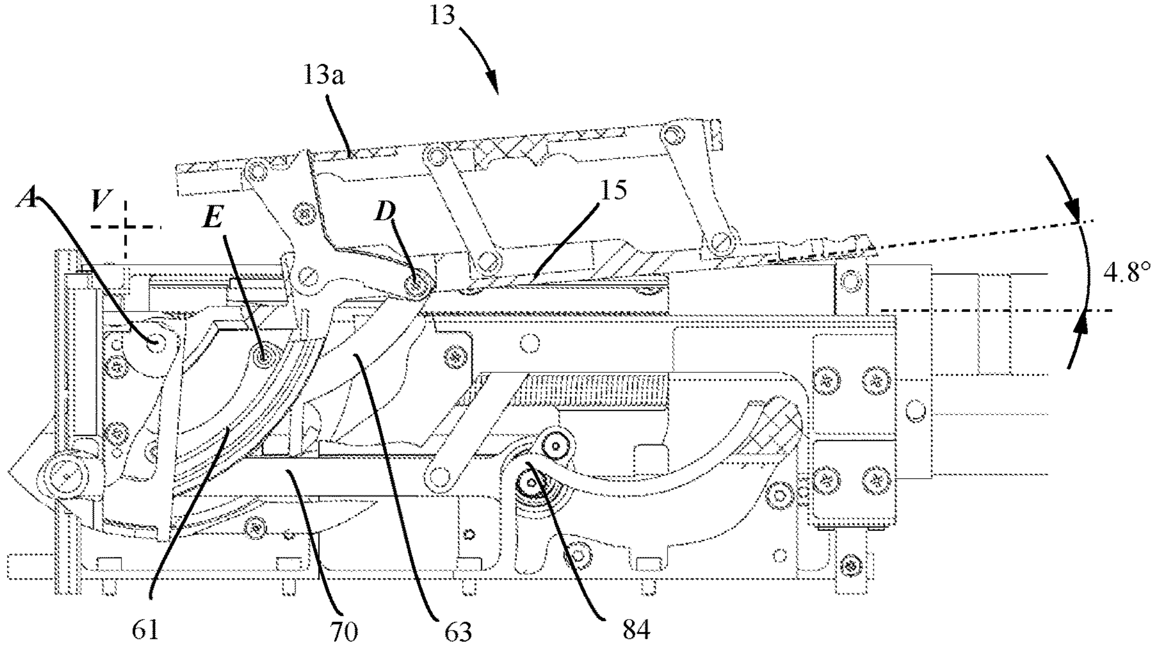
Figure 7D:
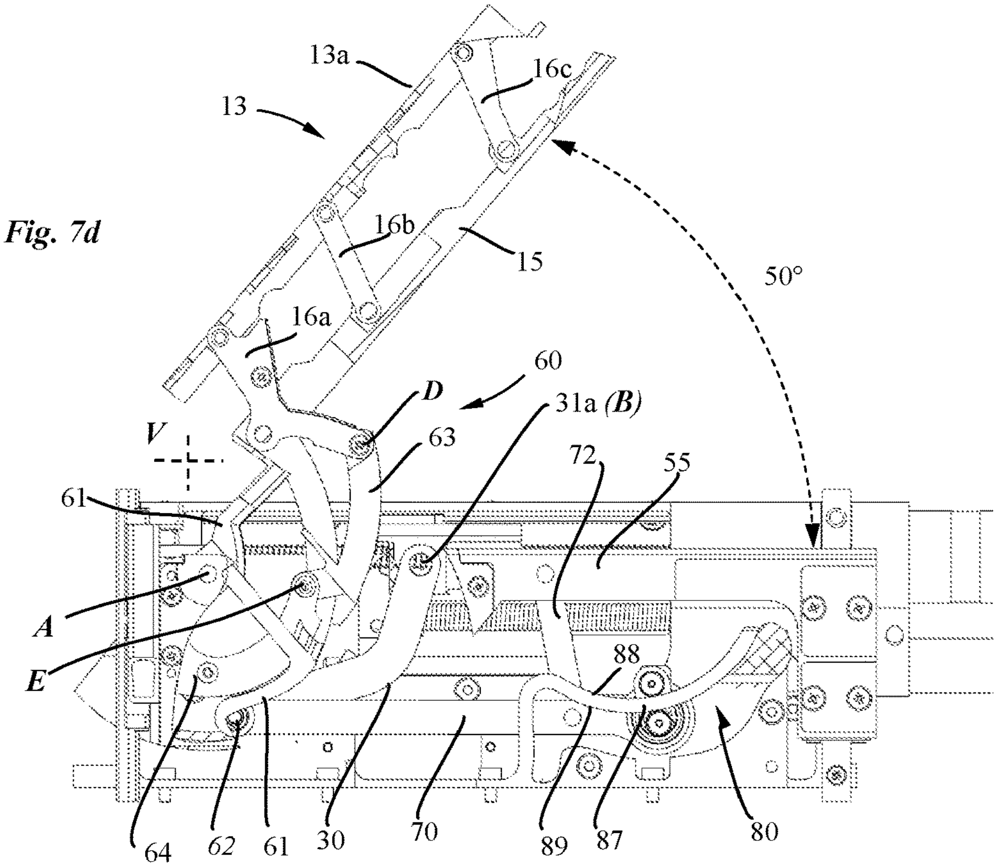
Figure 7E:
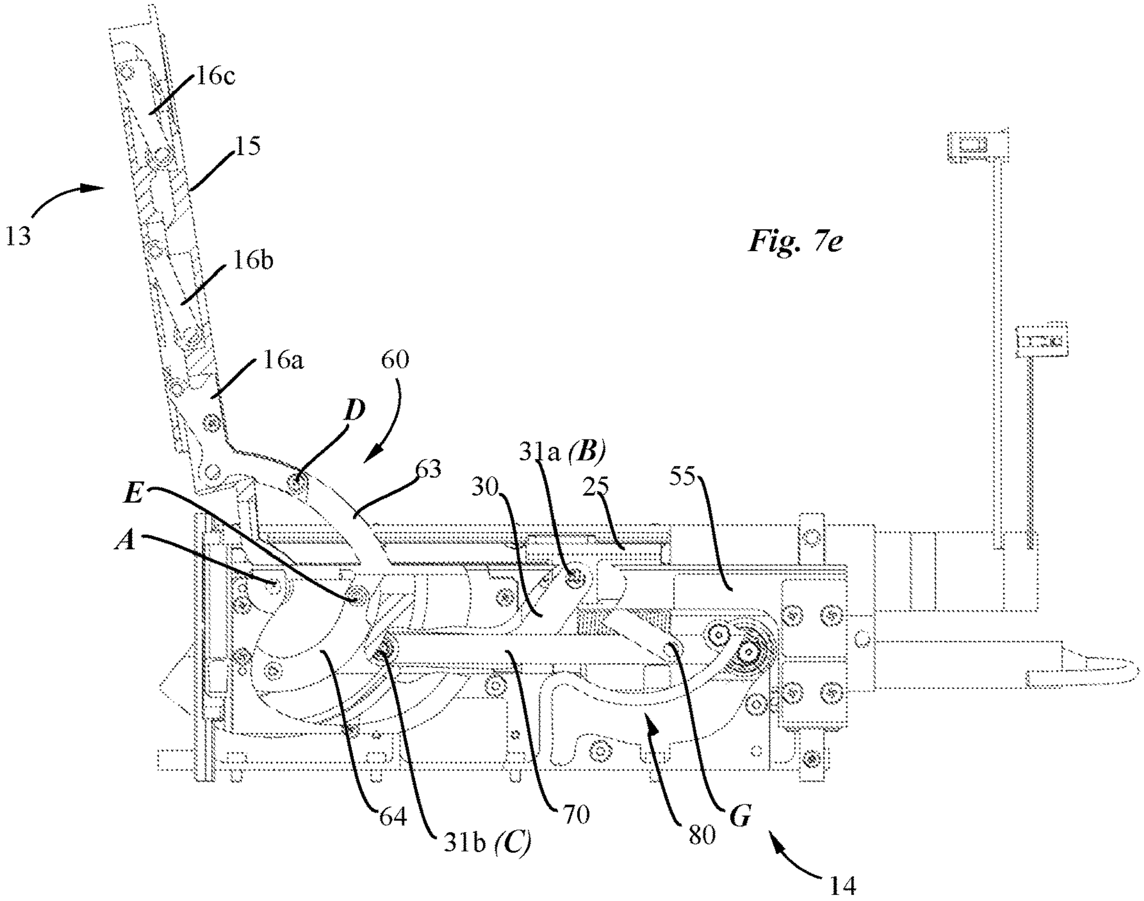

Upon the opening of the briefcase, this translation movement is followed by a pivoting of the fastening part 13*a*, and therefore of the lid 12, about a virtual axis of pivot V orthogonal to the direction of translation as illustrated by FIGS. 7*a* to 7*e*, with an angle of pivot that can vary substantially within a range of 90° for example, or even beyond. Of course, upon closing, the order of the movements and of the movements in themselves of the lid-fastening mechanism 13 are reversed. Thus, starting from the open configuration of the briefcase as illustrated by FIG. 7*e*, the lid-fastening part 13*a* is first folded pivotably to be brought into a plane parallel to that of the case 14 (FIG. 7*a*). The fastening part 13*a* is then translated such that the lid of the briefcase is fitted, at least partially, into the case 14 in a closing position.

For reasons of clarity, a detailed description of the different elements of the opening/closing mechanism incorporated into the briefcase will be given first, followed by a description of the kinematics of these elements during the opening of the lid 12 in translation then in rotation about the virtual axis of pivot V with reference to the different sequences of opening with respect to the case 14 as illustrated by FIGS. 7*a* to 7*e*.

Description of the Elements of the Opening/Closing Mechanism

Figure 9:
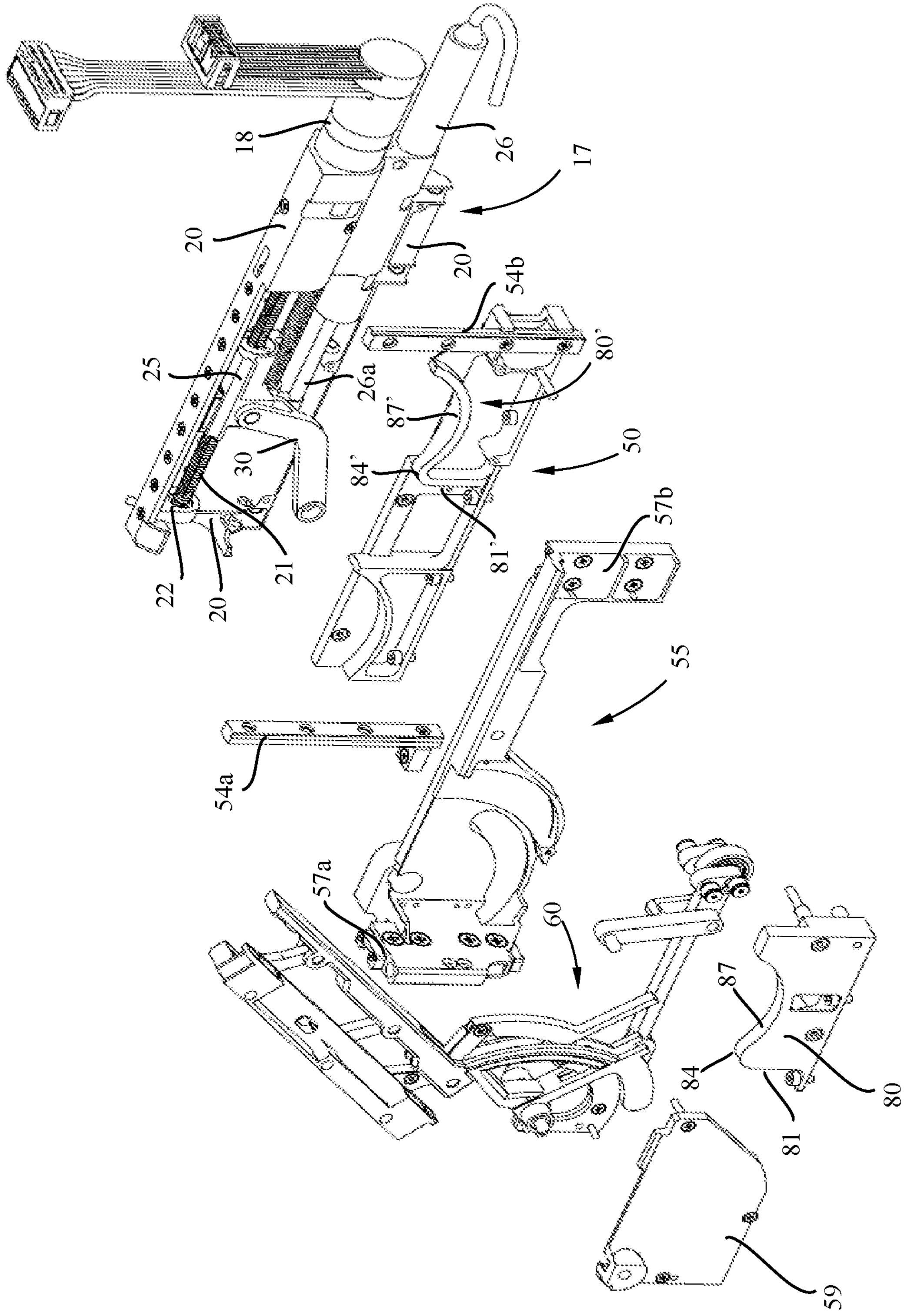
FIG. 9 is an exploded view of the opening/closing mechanism.

With reference in particular to FIG. 9, the actuator 17 includes a motor 18, supported by a base frame 20, as well as a worm screw 21, one end of which is coupled to the motor 18 while the other of its ends is arranged in a bearing 22 mounted on the base frame 20. The actuator 17 further includes an extension member 25 in the form of a carriage gripping the worm screw 21 such that a rotation of the worm screw 21 actuates the carriage 25 in a rectilinear direction transversal to the translation of the opening panel 12 and orthogonal to the virtual axis of pivot V. The guiding of the carriage 25 is performed by two rails and two ball pads (not illustrated) attached to the base frame 20.

The carriage 25 also includes a cylindrical opening receiving a stem 26*a* of a linear sensor 26 arranged to give the electronic system the position of the carriage 25. Such a design makes it possible to optimize the guiding and precision of the drive, also contributing to the reliability of the mechanism and to its resistance over time. Moreover, according to this preferred method of execution, the worm screw is driven directly by the motor, i.e. without a reduction gear, in order to have only a very low resistive torque of rotation of the screw implying a notable reduction in the noise generated by the actuator, and ease of use in the context of a manual actuation. In this way, reversibility is obtained regarding the use of the mechanism. In other words, the mechanism operates either by way of the motorization of the mechanism, or by manual driving which, of course, can be carried out without any effect on, or degradation of the subsequent motorized operation. It should be noted that the use of a worm screw of greater pitch and of a reduction gear providing an identical ratio may also be envisioned according to a variant of execution. For example, a worm screw with a pitch of 1 mm with a motor in direct contact is equivalent to a worm screw with a pitch of 3 mm coupled to a gear motor with a reduction ratio of 3. The important thing is to provide a constant ratio between the speed of the motor and the linear speed of the carriage 25 while also selecting a ratio, particularly with regard to the criteria of noise, electrical power consumption, weight and reversibility of the mechanism.

As can be made out, in particular for example in FIGS. 3 and 4, the actuator is coupled to a transmission, particularly including a transmission rod 30 arranged such as to connect the carriage 25 to a hinge part 61 rotationally actuatable about an axis of pivot A and forming an integral part of the hinge 60 (which will be described in detail below) linking the lid 12 to the case 14 of the briefcase. The transmission rod is similar to an angled rod 30 including a first and a second rectilinear portion 30*a*, 30*b* joined by an angled portion in order to form an angle between the two rectilinear portions preferably located between 120° and 140° (FIG. 3). The transmission rod 30 includes a first articulation 31*a*, at one of its ends, coupled pivotably to the carriage, 25, and a second articulation 31*b*, at its other end, coupled pivotably to the hinge part 61. The coupling of the transmission rod 30 at the level of the hinge part 61 is achieved by way of a coupling stem 32 (FIG. 6) connected to an end of the rod 30 such that the axis of the stem 32 is perpendicular to a plane wherein the rod 30 moves. This stem 32 includes on a segment an engagement surface 33 which can for example take the form of a roller rotationally actuatable about the stem 32. The specific form of the transmission rod 30 has been determined in order to reduce the bulk of the actuator while conserving the necessary track for the movement of the carriage 25.

Particularly with reference to FIGS. 3 to 6, the opening/closing mechanism includes a system for guiding in translation and in rotation. This device comprises a fixed frame 50 on which is mounted a movable frame 55 such as to be able to be moved translationally with respect to the fixed frame 50 (FIG. 9). For this purpose, two slide rails 54*a*, 54*b* are arranged on either side of the fixed frame 50 and are oriented at 90° with respect to one another in a plane perpendicular to a closing plane of the briefcase. The movable frame 55, meanwhile, has at each of its lateral sides two sliders 57*a*, 57*a*', 57*b*, 57*b*' (FIG. 8*b*) also oriented at 90° with respect to one another in the same plane. These four sliders are mounted translationally movable on the two slide rails 54*a*, 54*b* of the fixed frame 50.

The latter includes a guiding arrangement comprising a guiding path 52 as well as a first and a second guiding rail 80, 80' arranged facing one another (FIG. 6). The guiding rails 80, 80' have a profile virtually identical to the guiding path 52 and are in fact strictly identical in their function except that the rails 80, 80' contribute two additional functions, namely: i) the perfect control of the position of the lid 12 along a precise trajectory during the passing between the linear movement of the lid (in elevation) and the rotation thereof and ii) the perfect control of the position of the movable frame 55 during the opening of the lid which is in addition not affected by any external stress whatsoever that might be exerted on the lid 12 of the briefcase.

The guiding path 52 includes a rectilinear portion 52*a* extending perpendicularly to a plane of closing of the briefcase followed by an incurvated portion 52*b* in the form of a semi-circle concentric with the axis of pivot A. This guiding track is intended to impose on the roller 33 of the coupling stem 32, which is coupled to the transmission rod 30 and to the hinge piece 61, a translational movement followed by a movement in a semi-circle during the opening of the fastening part 13*a* of the lid 12 of the briefcase and conversely on closing. Like the guiding track 52, each guiding rail 80, 80' includes a vertical rectilinear portion 81, 81' as well as a semi-circular incurvated portion 87, 87, in which the tangent of the lower part of the semi-circle is essentially perpendicular to the rectilinear portion 81, 81'. Moreover, the radius of curvature of the incurvated portion 87, 87' is identical to the radius of curvature of the incurvated portion 52*b* of the guiding track 52 of the fixed frame 50. On the other hand, unlike the guiding track 52, each guiding rail 80, 80' includes a convex rounded portion 84, 84' linking the rectilinear portion 81, 81' to the incurvated portion 87, 87'.

The translational and rotational guiding system moreover includes a coupling rod 70 pivotably coupled by one of its ends to the hinge part 61 and to the transmission rod 30 about a pivot point C by way of the coupling stem 32. The coupling rod 70 is also coupled to the movable frame 55 by way of a rod support 72, one end of which is mounted pivotably on the coupling rod 70 about a pivot point G. The coupling rod 70 further includes at its other end a circular opening inside which is arranged a guiding member intended to cooperate with the first and the second guiding rail 80, 80' during the opening and the closing of the briefcase.

Figure 8A:
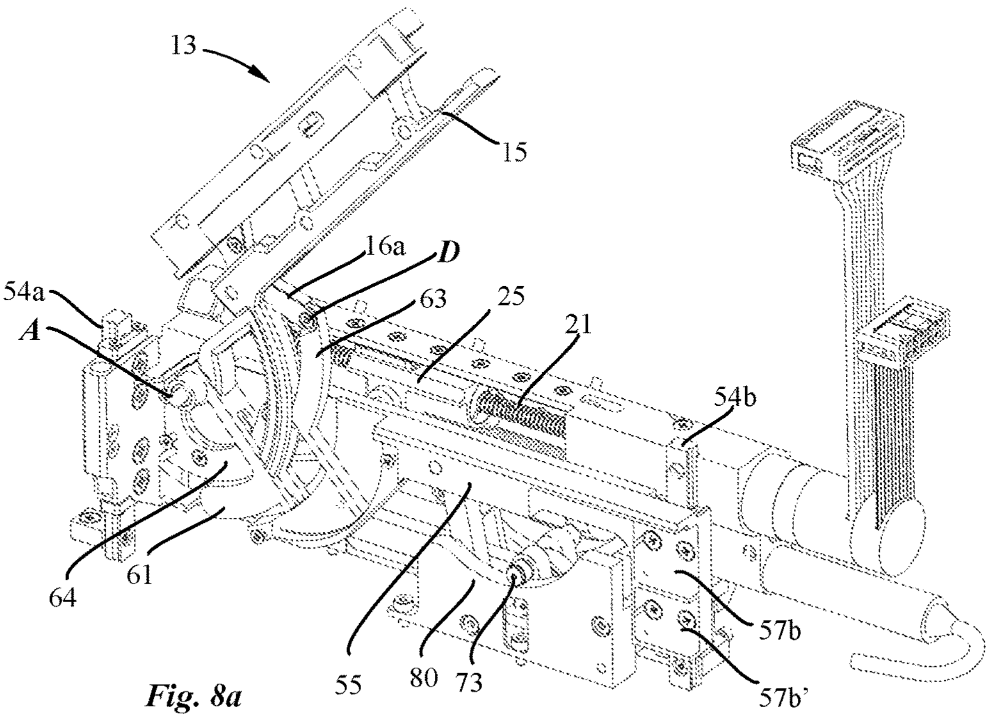
FIG. 8*a* is a perspective view of the actuator and the movable frame coupled to the hinge which is connected to the arrangement of parallelogram type.
Figure 8B:
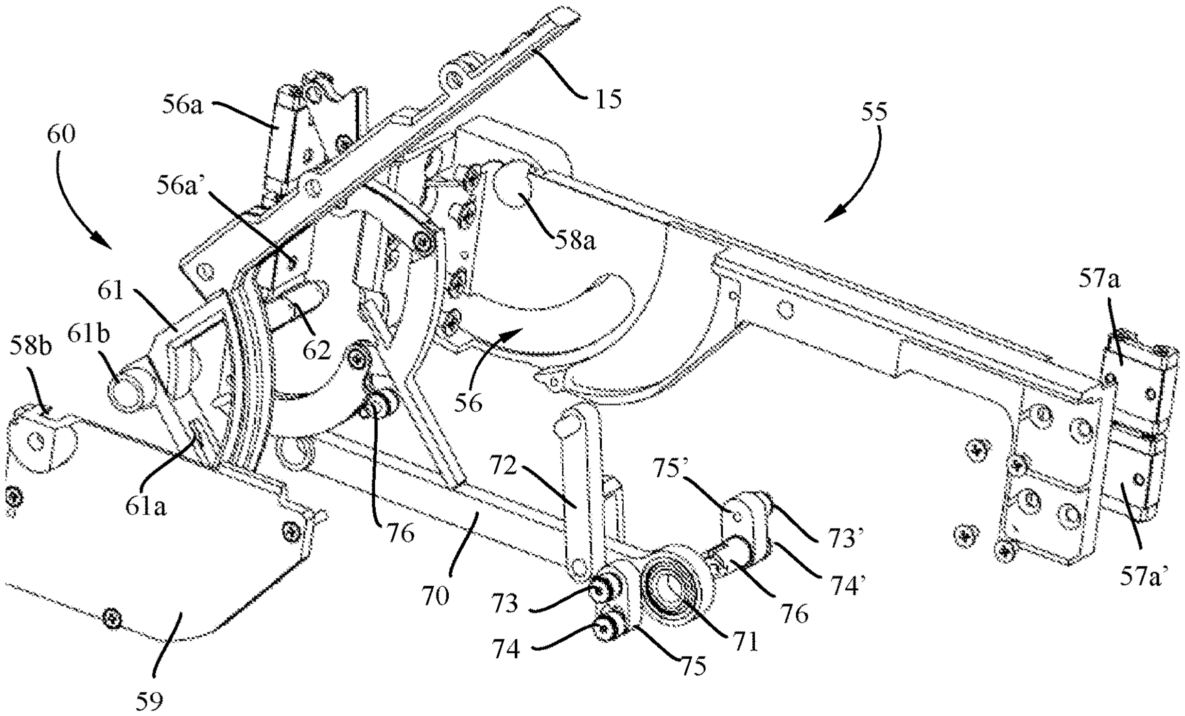
FIG. 8*b* is an exploded view of the movable frame of FIG. 8*a*.

As illustrated in particular in FIG. 8*b*, the guiding member includes a bearing 71 mounted inside the circular opening of the coupling rod 70 and two pairs of rollers 73, 74, 73', 74' each mounted on a roller support 75, 75' arranged on either side of the bearing. The roller supports 75, 75' are connected together by a connecting stem 76 passing inside the internal cage of the bearing. It should be noted that anti-friction means other than ball or roller bearings may be envisioned. By referring to FIG. 6 in particular, the coupling rod 70 is arranged between the first and the second guiding rail 80, 80' such that each pair of rollers 73, 74, 73', 74' of the guiding member cooperate with their respective guiding rail during the opening and the closing of the briefcase in order to ensure the pivoting of the lid 12 (FIG. 1*a*) along a precise trajectory without any play.

Given that the two guiding rails 80, 80' are identical and that the rollers disposed on either side of the bearing 71 are arranged to cooperate in the same way with their respective rail, only the bearing surfaces of the guiding rail 80 and the interaction of the rollers 73, 74 with the latter will be described below for the sake of brevity.

The guiding rail 80 includes a first and a second surface each defining a guiding track against which the respective rollers of the guiding member of the coupling rod 70 come into contact. More specifically, as per FIG. 2, the rectilinear portion includes a rectilinear bearing surface 82 and an opposing rectilinear bearing surface 83, the rounded portion includes a convex bearing surface 85 and an opposing concave bearing surface 86 and the incurvated portion includes an upper bearing surface 88 and a lower bearing surface 89.

The interaxial length between the pairs of rollers 73, 74, 73', 74' (FIG. 8*b*) is determined such that the rollers of each support 75, 75' are in contact on either side of the thickness of the respective guiding rail. Moreover, each roller support includes an elastically deformable area in order to vary the interaxial length of the rollers, on the one hand, to take up the play between the guiding rail and the rollers during the movement of the latter along the rail, and on the other hand, to avoid any seizing of the mechanism. The roller supports are preferably made of steel including a series of recesses extending transversally in the direction linking the interaxial lengths of the rollers. Thus, the metal portion acts as a spring between the axes of the rollers.

As can be seen more specifically in FIGS. 6 and 8*b*, the movable frame 55 has an incurvated window having a curve identical to the semi-circle 52*b* of the guiding path 52 of the fixed frame 50. The coupling stem 32 connects the transmission rod 30 to the hinge piece 61 through this window 56.

As per FIGS. 8*a* and 8*b*, the hinge 60 therefore includes the hinge piece 61 as well as an actuating arm 63 of an expandable and collapsible parallelogram which will be described later. The hinge part 61 is provided with a central cut-out 61*a* located in a plane perpendicular to the axis of pivot A. The actuating arm 63 is mounted pivotably about a pivot point E (FIG. 2) on an arm support 64 forming a single part with the movable frame 55. The arm 63 and the support 64 pass through the central cut-out 61*a* of the hinge part 61 while avoiding any friction with this part 61 when the latter pivots about its axis of pivot A. The hinge part 61 also has a cylindrical opening 61*b* crossed by a pivot 62, the ends of which are arranged in two pivot supports 58*a*, 58*b* located respectively on the movable frame 55 and on a cover 59, which forms with the movable frame 55 a housing for the various elements of the hinge 60.

As illustrated particularly in FIG. 6, the fastening mechanism 13 includes a link support 15, which forms a single part with the hinge part 61, and several links 16*a*, 16*b*, 16*c* coupled pivotably by one of their ends to the link support 15 and by the other of their ends to the fastening part 13*a* of the lid 12. One of the three links, in this case the link 16*a*, is moreover coupled pivotably to the actuating arm 63 about a pivot point D.

The fastening mechanism 13 of the cover forms the expandable and collapsible parallelogram. This is configured such as to modify the position of the fastening part 13*a* of the lid 12 with respect to the case 14 of the briefcase when the lid starts to be rotated so that the movement of opening of the lid can be done in a rotation about the virtual axis of pivot V located as near as possible to the case 14 while avoiding any friction with it.

Functional Description of the Opening/Closing Mechanism

When the briefcase is found in a closed configuration as illustrated by FIGS. 2 and 3, one of the sides of the carriage 25 is found near to the bearing 22 of the worm screw 21. The first portion 30*a* of the transmission rod 30 is aligned along an axis perpendicular to the closing plane of the briefcase while the parallelogram is in an expanded configuration. As per FIG. 3, the roller 33 of the coupling stem 32 is found in abutment against the rectilinear portion 52*a* of the guiding track 52. Moreover, the coupling rod 70 is found against the bottom of the case 14 with the rollers 73, 74 of the guiding member located on either side of the rectilinear portion 81 of the guiding rail 80 bearing against the rectilinear surface 82, 83 such as to provide coupling without any play. Finally, the actuating arm 63 and the link 16*a* actuating the collapsing of the parallelogram are retracted.

In order to open the briefcase, the motor 18 is actuated such that the rotation of the worm screw 21 moves the carriage 25 in the direction of the motor 18 according to the opening sequence illustrated by FIG. 7*a*. The movement of the carriage 25, during this sequence, has the effect of drawing the movable frame 55 in elevation along the slide rails 57*a*, 57*b* by way of the transmission rod 30, which pivots rotationally about the pivot point B. The translation of the movable frame 55 continues as the rod 30 is drawn by the carriage 25 until the roller 33 arrives at the top of the rectilinear portion 52*a* of the guiding track 52. During this sequence of elevation of the frame 55, the guiding stem 32 as well as the rod support 72 drive the coupling rod 70 upward. The rollers 73, 74 therefore move along their respective rectilinear surfaces 82, 83 until they are found at the top of the rectilinear portion 81 in order to provide perfect control of the position of the movable frame 55 during its elevation with respect to the fixed frame. Moreover, the hinge part 61 being coupled pivotably to the movable frame 55, the elevation of the latter also causes the elevation of the link support 15.

Figure 5:
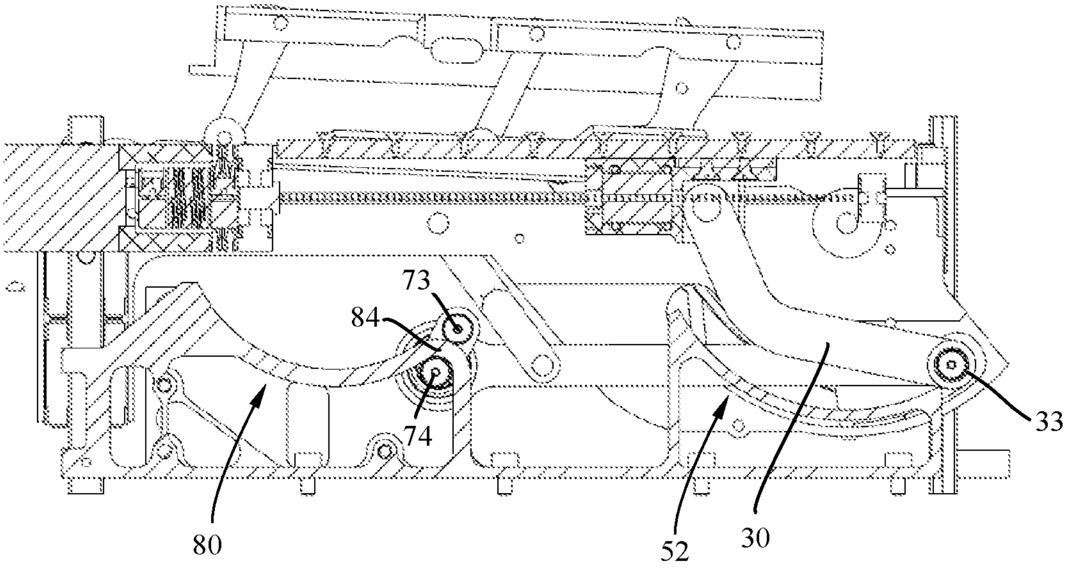
FIG. 5 is a view in different section planes of the opening/closing mechanism.

With reference to FIGS. 7*b* and 7*c*, the carriage 25 continues to move in the direction of the motor 18, drawing the coupling rod 70 and the hinge part 61 in a direction essentially along its longitudinal axis by way of the coupling stem 32 coupled to the transmission rod (FIG. 6). During this opening sequence, the traction movement applied to the hinge part 61 begins its rotation about the axis of pivot A, which has the effect of inclining the link support 15. Moreover, the movement of the coupling rod 70 tends to make the roller support 75 pivot such that the roller 73 moves in elevation along the convex surface 85 of the rounded portion 84 while the roller 74 is bearing against the concave surface 86. This is accompanied by a movement in elevation of one end of the coupling rod 70, which, by the effect of cooperation with the support 72 will also manifest as an elevation of the other end of the coupling rod 70 coupled in a rotary manner to the transmission rod 30 by way of the coupling stem. This makes it possible to ensure the perfect control of the position of the fastening part 13*a* of the lid (and consequently the lid) when the fastening part 13*a* passes from a translational movement to a rotational movement. During this critical phase, the roller 33 is forced to pass from the rectilinear portion 52*a* to the semi-circular incurvated portion 52*b* of the guiding path 52 (FIG. 5).

Figure 4:
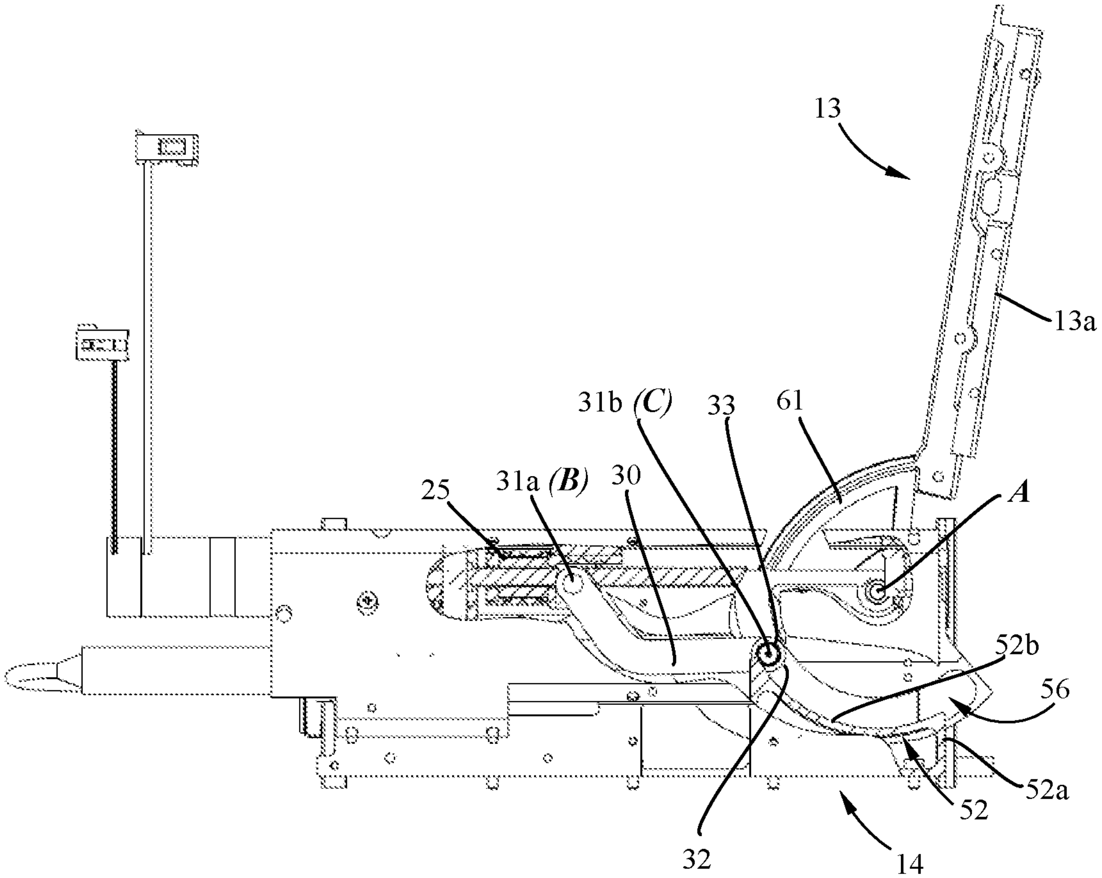
FIG. 4 is a similar view to FIG. 3 when the briefcase is in an open configuration.

With reference to FIG. 7*d*, the carriage 25 continues to move in the direction of the motor 18, which causes the movement of the roller 33 of the transmission rod 30 along the semi-circular portion 52*b* of the guiding path 52 (FIGS. 3 and 4). During this sequence, the coupling rod 70 and the hinge part 61 are further drawn by the coupling stem 32 in the same direction as the carriage 25. The hinge part 61 continues its rotation about the axis of pivot A, also increasing the angle of inclination of the link support 15 with respect to the case 14 of the briefcase. The movement of the roller 33 along the semi-circular portion 52*b* is done coincidentally with the movement of the rollers 73, 74 along the incurvated portion 87 respectively against the corresponding upper and lower bearing surfaces 88, 89 of the guiding rail 80 in order to insure the fluid pivoting of the lid along a precise trajectory while avoiding any undesirable movement of the lid.

Once the carriage 25 is found at the track end and the lid of the briefcase is entirely open, i.e. the fastening part 13*a* of the lid is inclined by over 90° with respect to the case 14 as illustrated in FIG. 7*e*, the rollers 73, 74 of the guiding member is found at the other end of the incurvated portion 87 while the roller 33 is itself found at the other end of the incurvated portion 52*b* of the guiding path 52 (FIG. 4). The second rectilinear portion 30*b* of the transmission rod 30 is arranged at this instant along an axis parallel to the bottom of the case 14.

The gradual opening of the fastening mechanism 13 of the lid with respect to the case 14 of the briefcase from a closed position wherein the lid is fitted into the case, to an open position wherein the lid forms an angle of at least 90° with the case 14, is made possible owing to the expandable and collapsible parallelogram. The actuating arm 23 of the parallelogram makes it possible to bring it into a collapsed configuration in the open position of the briefcase.

With reference to FIG. 7*a*, the actuating arm 63, the arm support 64 and the actuating link 16*a* are retracted and will gradually unfold during the opening of the briefcase by their rotation with respect to one another about their respective pivot point D, E until a fully unfolded position is reached as illustrated in FIG. 7*e*. The actuating link 16*a* is arranged such as to fold against the link support 15 and the fastening part 13*a* of the lid when the lid is approaching an angle of 90° with respect to the case 14, at the same time driving the folding of the two other links 16*b*, 16*c*.

It is self-evident that the mechanism that has just been described is completely reversible and hence the functional description of the mechanism during the closing of the lid of the briefcase is not described herein for reasons of brevity.

Moreover the opening/closing mechanism that has been described is not exclusively adapted to a briefcase but to any other item including an opening panel and a casing.

LIST OF REFERENCE NUMBERS

- Opening/closing mechanism 10
  - Opening part 12
    - Mechanism 13 of fastening to the opening panel
      - Fastening part 13*a*
      - Virtual axis of pivot V
      - Link support 15
      - Links 16*a*, 16*b*, 16*c*
        - Actuating link 16*a*
  - Casing 14
    - Case
  - Actuator 17
    - Motor 18
      - Base frame 20
    - Worm screw 21
      - Bearing 22

Extension member 25
Carriage
Linear sensor 26
Stem 26*a*
Transmission
Transmission rod 30
Angled rod
First rectilinear portion 30*a*
Second rectilinear portion 30*b*
Angled portion
First articulation 31*a*
Pivot B
Second articulation 31*b*
Pivot C
Coupling stem 32
Engagement portion
Roller 33
Coupling rod 70
Circular opening 70*a*
Bearing 71
Ball bearing
Rod support 72
Pivot point F
Pivot point G
Guiding member
First pair of rollers 73, 74
First roller support 75
Second pair of rollers 73, 74'
Second roller support 75'
Linking stem 76 of the roller supports
Translational and rotational guiding system
Fixed frame 50
Slide rails 54*a*, 54*b*
Guiding arrangement
Guiding path 52
Rectilinear portion 52*a*
Incurvated portion 52*b*
Semi-circular portion
First guiding rail 80
Rectilinear portion 81
Rectilinear bearing surface 82
Opposing rectilinear bearing surface 83
Rounded portion 84
Convex bearing surface 85
Concave bearing surface 86
Incurvated portion 87
Upper bearing surface 88
Lower bearing surface 89
Second guiding rail 80'
Rectilinear portion 81'
Rounded portion 84'
Incurvated portion 87'
Movable frame 55
Guiding window 56
Incurvated
Semi-circle
Sliders 57*a*, 57*a'*, 57*b*, 57*b'*
Pivot supports 58*a*, 58*b*
Cover 59
Hinge 60
Hinge part 61
Central cut-out 61*a*
Cylindrical opening 61*b*
Axis of pivot A
Pivot 62
Parallelogram-actuating member
Actuating arm 63

Pivot point D
Pivot point E
Arm support 64

The invention claimed is:

1. A mechanism for the opening/closing of an opening panel with respect to a casing, the mechanism being configured to cause on opening a translation of the opening panel from a closing plane to an opening plane parallel to the closing plane, followed by a pivoting of the opening panel about an axis of pivot (V) orthogonal to the translation of the opening panel, and conversely on closing, said mechanism including:

a fixed frame that is immovably fixed to the casing, a movable frame mounted in translation on the fixed frame, a hinge part mounted pivotably on the movable frame and coupled to a mechanism of fastening to the opening panel, an actuator comprising a screw driven by a motor to actuate an extension member actuatable in an actuation direction orthogonal to the axis of pivot (V) of the opening panel, a transmission including a transmission rod comprising a first articulation coupled pivotably to the extension member, and a second articulation coupled pivotably to the hinge part, the fixed frame including a guiding arrangement configured to cooperate with the transmission such that a movement of the extension member, during the opening of the mechanism, causes an elevation of the movable frame with respect to the fixed frame, then a rotation of the hinge part by a desired angle in order to pass from a closed configuration to an opening configuration of the mechanism for the opening/closing of an opening panel, and wherein the transmission further includes a coupling rod coupled pivotably by one of its ends to the hinge part and to the transmission rod and including at another one of its ends a guiding member, the guiding arrangement further including a first and a second guiding rail arranged to cooperate with the guiding member.

2. The mechanism as claimed in claim 1, wherein the guiding arrangement includes a guiding path provided with a rectilinear portion followed by a semi-circular incurvated portion, said portions being intended to cooperate with one end of the transmission rod under a movement of the extension member in the actuation direction.

3. The mechanism as claimed in claim 1, wherein the first and the second guiding rail are arranged facing one another and each successively include a rectilinear portion extending vertically, a convex portion and an incurvated portion, each portion including a first and a second surface located on either side of the guiding rail and each defining a guiding path.

4. The mechanism as claimed in claim 3, wherein said guiding member includes a bearing arranged inside a circular opening of the coupling rod and two pairs of rollers each mounted on a roller support arranged on either side of the bearing such that the rollers of each support are maintained in contact on either side of the thickness of the respective guiding rail to be moved along their respective guiding paths during the opening and the closing of the mechanism in order to provide the pivoting of the opening panel along a precise trajectory without any play.

5. The mechanism as claimed in claim 1, wherein the mechanism of fastening to the opening panel is arranged to be rotationally actuated about the axis of pivot (V) orthogonal to the translation of the opening panel, which corresponds to a virtual axis of pivot located above the casing.

6. A mechanism for the opening/closing of an opening panel with respect to a casing, the mechanism being configured to cause on opening a translation of the opening panel from a closing plane to an opening plane parallel to the closing plane, followed by a pivoting of the opening panel about an axis of pivot (V) orthogonal to the translation of the opening panel, and conversely on closing, said mechanism including:

a fixed frame that is immovably fixed to the casing, a movable frame mounted in translation on the fixed frame, a hinge part mounted pivotably on the movable frame and coupled to a mechanism of fastening to the opening panel, an actuator comprising a screw driven by a motor to actuate an extension member actuatable in an actuation direction orthogonal to the axis of pivot (V) of the opening panel, a transmission including a transmission rod comprising a first articulation coupled pivotably to the extension member, and a second articulation coupled pivotably to the hinge part, the fixed frame including a guiding arrangement configured to cooperate with the transmission such that a movement of the extension member, during the opening of the mechanism, causes an elevation of the movable frame with respect to the fixed frame, then a rotation of the hinge part by a desired angle in order to pass from a closed configuration to an opening configuration of the mechanism for the opening/closing of an opening panel, wherein the mechanism of fastening to the opening panel-includes a link support forming a single part with the hinge part and several links coupled pivotably by one of their ends to the link support and by the other of their ends to a part of fastening to the opening panel, the mechanism of fastening forming an expandable and collapsible parallelogram.

7. The mechanism as claimed in claim 6, further including a member of actuation of the parallelogram comprising an actuating arm coupled pivotably to one of the links and coupled pivotably to an arm support, the arm support forming a single part with the movable frame.

8. A mechanism for the opening/closing of an opening panel with respect to a casing, the mechanism being configured to cause on opening a translation of the opening panel from a closing plane to an opening plane parallel to the closing plane, followed by a pivoting of the opening panel about an axis of pivot (V) orthogonal to the translation of the opening panel, and conversely on closing, said mechanism including:

a fixed frame that is immovably fixed to the casing, a movable frame mounted in translation on the fixed frame, a hinge part mounted pivotably on the movable frame and coupled to a mechanism of fastening to the opening panel, an actuator comprising a screw driven by a motor to actuate an extension member actuatable in an actuation direction orthogonal to the axis of pivot (V) of the opening panel, a transmission including a transmission rod comprising a first articulation coupled pivotably to the extension member, and a second articulation coupled pivotably to the hinge part, the fixed frame including a guiding arrangement configured to cooperate with the transmission such that a movement of the extension member, during the opening of the mechanism, causes an elevation of the movable frame with respect to the fixed frame, then a rotation of the hinge part by a desired angle in order to pass from a closed configuration to an opening configuration of the mechanism for the opening/closing of an opening panel, further including a coupling stem connected to one end of the transmission rod such that the axis of the stem is perpendicular to a plane wherein the transmission link moves, and in that the stem is moreover coupled pivotably to the hinge part.

9. The mechanism as claimed in claim 8, wherein the movable frame includes a window of elongated and incurvated form inside which the coupling stem passes through.

10. A mechanism for the opening/closing of an opening panel with respect to a casing, the mechanism being configured to cause on opening a translation of the opening panel from a closing plane to an opening plane parallel to the closing plane, followed by a pivoting of the opening panel about an axis of pivot (V) orthogonal to the translation of the opening panel, and conversely on closing, said mechanism including:

a fixed frame that is immovably fixed to the casing, a movable frame mounted in translation on the fixed frame, a hinge part mounted pivotably on the movable frame and coupled to a mechanism of fastening to the opening panel, an actuator comprising a screw driven by a motor to actuate an extension member actuatable in an actuation direction orthogonal to the axis of pivot (V) of the opening panel, a transmission including a transmission rod comprising a first articulation coupled pivotably to the extension member, and a second articulation coupled pivotably to the hinge part, the fixed frame including a guiding arrangement configured to cooperate with the transmission such that a movement of the extension member, during the opening of the mechanism, causes an elevation of the movable frame with respect to the fixed frame, then a rotation of the hinge part by a desired angle in order to pass from a closed configuration to an opening configuration of the mechanism for the opening/closing of an opening panel, wherein each end of the transmission rod is coupled pivotably to, respectively, the extension member and to the hinge part on either side of the movable frame.

11. A mechanism for the opening/closing of an opening panel with respect to a casing, the mechanism being configured to cause on opening a translation of the opening panel from a closing plane to an opening plane parallel to the closing plane, followed by a pivoting of the opening panel about an axis of pivot (V) orthogonal to the translation of the opening panel, and conversely on closing, said mechanism including:

a fixed frame that is immovably fixed to the casing, a movable frame mounted in translation on the fixed frame, a hinge part mounted pivotably on the movable frame and coupled to a mechanism of fastening to the opening panel, an actuator comprising a screw driven by a motor to actuate an extension member actuatable in an actuation direction orthogonal to the axis of pivot (V) of the opening panel, a transmission including a transmission rod comprising a first articulation coupled pivotably to the extension member, and a second articulation coupled pivotably to the hinge part, the fixed frame including a guiding arrangement configured to cooperate with the transmission such that a movement of the extension member, during the opening of the mechanism, causes an elevation of the movable frame with respect to the fixed frame, then a rotation of the hinge part by a desired angle in order to pass from a closed configuration to an opening configuration of the mechanism for the opening/closing of an opening panel, wherein the extension member is in the form of a carriage mounted in translation on a worm screw, one of the ends of the worm screw being coupled to a motor, the other end being mounted in a bearing such that the rotation of the motor drives the carriage along the rectilinear direction orthogonal to the axis of pivot (V) of the opening panel.

* * * * *